United States Patent Office.

HERRMANN KOEHLER, OF NEW YORK, N. Y.

Letters Patent No. 107,787, dated September 27, 1870.

IMPROVEMENT IN THE MANUFACTURE OF SPIRITS FROM STARCH.

The Schedule referred to in these Letters Patent and making part of the same.

*To all whom it may concern:*

Be it known that I, HERRMANN KOEHLER, of the city, county, and State of New York, have invented a new and useful Improvement in Manufacturing Whisky from Starch; and I do hereby declare the following to be a full, clear, and exact description thereof, which will enable those skilled in the art to make and use the same.

This invention consists in producing whisky from starch, by first preparing from the starch a thin mash, then treating this mash with sulphuric acid, so as to produce a sirup of about 15° Baumé, then concentrating this sirup, by means of a vacuum pan or other suitable apparatus, to 38° Baumé, and finally, allowing it to ferment, and subjecting it to the distilling operation in any suitable apparatus.

In carrying out my invention, I take starch prepared from corn, or any other material generally used for this purpose, and from this starch I prepare a thin mash, by mixing it with a sufficient quantity of water. To this mash I add sulphuric acid, whereby the starch is transformed into glucose, and a sirup is obtained of the density of about 15° Baumé.

This sirup I subject to a concentrating process, by evaporation in a vacuum pan or other suitable apparatus, until its density is about 38° Baumé.

The concentrated sirup thus obtained I allow to ferment, and then I subject it to a distilling process in any suitable apparatus.

By these means I am enabled to produce a liquor, which is superior in aroma and in purity to ordinary whisky, and which can be manufactured at a comparatively low figure.

What I claim as new, and desire to secure by Letters Patent, is—

The within-described process for manufacturing whisky, consisting of treating a thin mash of starch with an acid, and then evaporating, fermenting, and distilling the same, substantially as described.

This specification signed by me this 29th day of August, 1870.

HERRMANN KOEHLER.

Witnesses:
 ADALBERT FISCHER,
 W. HAUFF.